(12) United States Patent  (10) Patent No.: US 8,002,990 B2
Schroeder et al.  (45) Date of Patent: Aug. 23, 2011

(54) USES OF FIBRILLATED NANOFIBERS AND THE REMOVAL OF SOLUBLE, COLLOIDAL, AND INSOLUBLE PARTICLES FROM A FLUID

(75) Inventors: John H. Schroeder, Mt. Laurel, NJ (US); Kenneth DeRosa, Flemington, NJ (US); Andrew W. Lombardo, West Haven, CT (US); Nichole Pennisi, Middletown, DE (US); Peter A. Yarnell, Sellersville, PA (US)

(73) Assignee: KX Technologies, LLC, West Haven, CT (US)

( * ) Notice: Subject to any disclaimer, the term of this patent is extended or adjusted under 35 U.S.C. 154(b) by 376 days.

(21) Appl. No.: 12/177,610

(22) Filed: Jul. 22, 2008
(Under 37 CFR 1.47)

(65) Prior Publication Data
US 2009/0188870 A1  Jul. 30, 2009

Related U.S. Application Data

(60) Provisional application No. 60/952,474, filed on Jul. 27, 2007.

(51) Int. Cl.
*B01D 15/00* (2006.01)
(52) U.S. Cl. ......... 210/665; 210/688; 210/773; 210/266
(58) Field of Classification Search .................. 210/665, 210/688, 773, 266
See application file for complete search history.

(56) References Cited

U.S. PATENT DOCUMENTS

| 4,190,532 A | 2/1980 | Halbfoster |
| 4,902,427 A * | 2/1990 | Szczepanik ................ 210/484 |
| 6,872,311 B2 * | 3/2005 | Koslow ..................... 210/502.1 |
| 6,998,058 B2 * | 2/2006 | Koslow ....................... 210/764 |
| 2009/0314163 A1 * | 12/2009 | Mayer et al. ................ 96/111 |
| 2010/0176044 A1 * | 7/2010 | Domb et al. .................. 210/205 |

FOREIGN PATENT DOCUMENTS

| KR | 1020030045794 | 7/2003 |
| KR | 1020040088046 | 11/2004 |

* cited by examiner

*Primary Examiner* — Chester T Barry
(74) *Attorney, Agent, or Firm* — DeLio & Peterson, LLC; Robert Curcio

(57) ABSTRACT

A filter for removing soluble, colloidal, and insoluble particles from a fluid, including lead using a first filter media for filtering soluble material from the fluid, a second filter media, adjacent and in fluid communication with, the first filter media, for filtering soluble material from said fluid, wherein the first and second filter media create a physical non-soluble particle barrier at their interface for capturing non-soluble particles, that when retained at the interface, become soluble over time in the fluid, and are subsequently removed by the second filter media. At least one of the filter media can be fibrillated nanofibers that are loaded with finely subdivided media of powdered ion exchange resins. A third filter media may be placed between the first and second filter media to enhance capturing and dissolving the physical non-soluble particles.

27 Claims, 6 Drawing Sheets

| After 2 L | | | | | | | | | | | | | |
|---|---|---|---|---|---|---|---|---|---|---|---|---|---|
| Sample | MFP | [$Pb_t$] | [$Pb_{1.2}$] | [$Pb_{0.1}$] | [$Pb_{tp}$] | Avg ($Pb_{tp}$) | % [$Pb_{tp}$] | [$Pb_d$] | % [$Pb_d$] | Total Particulate Reduction | Avg TPR | Fine Particulate Reduction | Avg FPR |
| Influent | NA | 153 | 122 | 108 | 45 | NA | 29% | 14 | 31% | NA | NA | NA | NA |
| ControlA | NA | 151 | 122 | 107 | 44 | 44.5 | 29% | 15 | 34% | 2% | 1% | -7% | -4% |
| ControlB | NA | 150 | 119 | 105 | 45 | | 30% | 14 | 31% | 0% | | 0% | |
| PI004A | 0.26 | 97.9 | 98.4 | 96.6 | 1.3 | 2.5 | 1% | 1.3 | 138% | 97% | 95% | 87% | 89% |
| PI004B | | 100 | 97.6 | 96.4 | 3.6 | | 4% | 1.2 | 33% | 92% | | 91% | |
| PI005A | 0.45 | 100 | 102 | 96.7 | 3.3 | 5.3 | 3% | 5.3 | 161% | 93% | 88% | 62% | 62% |
| PI005B | | 103 | 101 | 95.7 | 7.3 | | 7% | 5.3 | 73% | 84% | | 62% | |
| PI006A | 0.77 | 103 | 99.7 | 95.7 | 7.3 | 7.1 | 7% | 4 | 55% | 84% | 84% | 71% | 77% |
| PI006B | | 103 | 98.5 | 96.1 | 6.9 | | 7% | 2.4 | 35% | 85% | | 83% | |
| PI007A | 1.16 | 103 | 98.5 | 95.4 | 7.6 | 8.7 | 7% | 3.1 | 41% | 83% | 81% | 78% | 58% |
| PI007B | | 105 | 104 | 95.2 | 9.8 | | 9% | 8.8 | 90% | 78% | | 37% | |
| PI00785A | 2.69 | 115 | 111 | 98.5 | 16.5 | 15.9 | 14% | 12.5 | 76% | 63% | 65% | 11% | 22% |
| PI00785B | | 115 | 109 | 99.7 | 15.3 | | 13% | 9.3 | 61% | 66% | | 34% | |

FIG. 4

| After 4 L | | | | | | | | | | | | | |
|---|---|---|---|---|---|---|---|---|---|---|---|---|---|
| Sample | MFP | [$Pb_t$] | [$Pb_{1.2}$] | [$Pb_{0.1}$] | [$Pb_{tp}$] | Avg ($Pb_{tp}$) | % [$Pb_{tp}$] | [$Pb_d$] | % [$Pb_d$] | Total Particulate Reduction | Avg TPR | Fine Particulate Reduction | Avg FPR |
| Influent | NA | 141 | 131 | 105 | 36 | NA | 26% | 26 | 72% | NA | NA | NA | NA |
| ControlA | NA | 144 | 128 | 109 | 35 | 36.5 | 24% | 19 | 54% | 22% | 19% | -36% | -50% |
| ControlB | NA | 145 | 130 | 107 | 38 | | 26% | 23 | 61% | 16% | | -64% | |
| PI004A | 0.26 | 103 | 102 | 101 | 2 | 1.5 | 2% | 1 | 50% | 96% | 97% | 93% | 93% |
| PI004B | | 104 | 104 | 103 | 1 | | 1% | 1 | 100% | 98% | | 93% | |
| PI005A | 0.45 | 109 | 107 | 106 | 3 | 5.0 | 3% | 1 | 33% | 93% | 89% | 93% | 79% |
| PI005B | | 112 | 110 | 105 | 7 | | 6% | 5 | 71% | 84% | | 64% | |
| PI006A | 0.77 | 111 | 104 | 103 | 8 | 8.0 | 7% | 1 | 13% | 82% | 82% | 93% | 93% |
| PI006B | | 111 | 104 | 103 | 8 | | 7% | 1 | 13% | 82% | | 93% | |
| PI007A | 1.16 | 110 | 111 | 104 | 6 | 7.5 | 5% | 7 | 117% | 87% | 83% | 50% | 54% |
| PI007B | | 113 | 110 | 104 | 9 | | 8% | 6 | 67% | 80% | | 57% | |
| PI00785A | 2.69 | 123 | 121 | 106 | 17 | 15.5 | 14% | 15 | 88% | 62% | 66% | -7% | -4% |
| PI00785B | | 122 | 122 | 108 | 14 | | 11% | 14 | 100% | 69% | | 0% | |

FIG. 5

USES OF FIBRILLATED NANOFIBERS AND THE REMOVAL OF SOLUBLE, COLLOIDAL, AND INSOLUBLE PARTICLES FROM A FLUID

BACKGROUND OF THE INVENTION

1. Field of the Invention

The present invention relates to filters for removal of soluble and colloidal, non-soluble particles in a fluid. Specifically, the present invention relates to the removal of soluble and insoluble lead from a fluid, and more specifically, to the removal of soluble and insoluble lead from high pH fluid using fibrillated nanofibers as one of the filter media.

2. Description of Related Art

Certain water treatment applications are characterized by the need to remove both dissolved and suspended or colloidal materials. Although it has been used in numerous consumer products, lead is a toxic metal now known to be harmful to human health if inhaled or ingested. Important sources of lead exposure include: ambient air, soil and dust (both inside and outside the home), food (which can be contaminated by lead in the air or in food containers), and water (from the corrosion of plumbing). Materials such as ion exchange resins and reverse osmosis membranes effectively reduce or fully remove dissolved ionic species. Particulate lead at high pH exists primarily as colloidal lead carbonates. These colloidal particulate solids can be physically removed if the filter media provides for a fine enough mesh that can also accommodate pressure differentials.

Standards have been developed and promulgated to regulate the amount of contaminants allowed in drinking water. For example, one such standard is NSF/ANSI 53, entitled "DRINKING WATER TREATMENT UNITS—HEALTH EFFECT." This is an NSF International Standard and an American National Standard for establishing minimum requirements for materials, design, construction, and performance of point-of-use and point-of-entry drinking water treatment systems that are designed to reduce specific health-related contaminants in public or private water supplies. This standard, as well as other related standards and protocols, governs the amount of contaminants in drinking water, including lead, governs testing protocols for removal of those contaminants which provides a benchmark for the efficacy of water filters designed to remove or reduce such contaminants.

For example, pursuant to the NSF requirement, the influent challenge for total lead is 0.15 mg/L or 150 ppb of which 30% or 50 ppb is total particulate lead, and 20% of the total particulate lead or 10 ppb is fine lead between 0.1 and 1.2 microns in size. The maximum effluent lead concentration is 0.010 mg/L. The total lead requirement is applicable for lead pH 6.5 and lead pH 8.5 reduction testing. The lead particulate and fine lead values are of the greatest concern lead pH 8.5 testing only. A filter designed to specifications of the present invention is capable of meeting the NSF or other similar standard challenge requirements for the reduction of lead in drinking water.

For many years fibers such as cellulose have been utilized as filter aids to improve flow and reduce differential pressure across the surface of a bed or precoat. Fibers dramatically improve removal of colloidal materials, especially when used in conjunction with charged materials such as ion exchange resins. U.S. Pat. No. 4,190,532 issued to Halbfoster on Feb. 26, 1980, entitled "CHARGED FILTER AID MATERIAL AND ION EXCHANGE BED," first described the synergistic effects of combining charged ion exchange resins and charged filter aid such as treated cellulose fiber. The invention embodied in this patent is now widely used commercially in applications such as treating high quality condensate water in power plants.

A more recent patent, U.S. Pat. No. 6,872,311 issued to Koslow on Mar. 29, 2005, entitled "NANOFIBER FILTER MEDIA," describes the use of nanofibers as an enhanced filtration medium. The patent teaches that a physical process called fibrillation enhances the performance of standard filter media such as cellulose fiber. Moreover, this patent also teaches a process for making an improved air filter medium with the incorporation of nanofibers. This process has also been commercialized for filtration purposes in combination with activated carbon.

There are a number of independent agencies, such as NSF International, UL, and WQA, to name a few, that evaluate and certify the performance of filtering devices that remove lead from drinking water. Generally, their seal of approval appears on the device and product packaging. New testing criteria from these agencies require the removal of lead in high pH fluid.

SUMMARY OF THE INVENTION

Bearing in mind the problems and deficiencies of the prior art, it is therefore an object of the present invention to provide a filter for removing soluble, colloidal, and insoluble particles from a fluid.

It is another object of the present invention to provide a filter for removing soluble, colloidal, and insoluble material in a high pH fluid environment.

It is yet another object of the present invention to provide a filter for removing soluble, colloidal, and insoluble material in a high pH fluid environment using fibrillated nanofibers as one of the filter media.

It is another object of the present invention to provide a filter for removing soluble, colloidal, and insoluble lead from a fluid treated to drinking water specifications.

It is a further object of the present invention to provide a filter having a filter media of fibrillated nanofibers formed in a pleated sheet for use in removing soluble, colloidal, and insoluble lead from high pH fluid.

Still other objects and advantages of the invention will in part be obvious and will in part be apparent from the specification.

The above and other objects, which will be apparent to those skilled in the art, are achieved in the present invention which, in a first aspect, is directed to a filter for removing soluble, colloidal, and insoluble material from a fluid comprising: a container for receiving ingress fluid, and for securing and introducing filter media to the fluid; a first filter media for filtering soluble material from the fluid; a second filter media, adjacent and in fluid communication with, the first filter media, for filtering the soluble material from the fluid; wherein the first and second filter media create a physical barrier for the colloidal material at their interface for capturing the colloidal particles; the colloidal particles retained at the interface until becoming soluble in the fluid, passing through the interface, and being removed by the second filter media.

The soluble and colloidal material may include lead, organic contaminants, or inorganic contaminants. The filter media may comprise fibrillated nanofibers as one of the filter media. The filter media may include ion exchange beads, powder, resins, an adsorbent, zeolites, or carbon.

A third filter media, located at the interface, may be used for capturing the colloidal and insoluble particles.

In a second aspect, the present invention is directed to a filter for removing soluble, insoluble, and colloidal lead particles from a high pH fluid comprising: a container for receiving ingress fluid, and for securing and introducing filter media to the fluid; a first filter media including ion exchange beads, resin, or powder, for filtering soluble lead from the fluid; a second filter media, adjacent and in fluid communication with, the first filter media including fibrillated nanofibers, for filtering soluble lead from the fluid; wherein the first and second filter media create a physical colloidal lead barrier at their interface for capturing the colloidal lead particles; the colloidal lead particles retained at the interface until becoming soluble and absorbed by the fluid, thus passing through the interface, and removed from the fluid by the second filter media.

In a third aspect, the present invention is directed to a process for removing soluble and particulate lead from a high pH fluid comprising: introducing a first filter media in the path of fluid flow wherein the fluid contains soluble and particulate lead; removing soluble lead from the fluid by the first filter media; capturing particulate lead particles at an interface region where a second filter media is introduced in the path of fluid flow, and keeping the particulate lead particles captured until soluble in the fluid; and removing soluble lead from the fluid by the second filter media.

In a fourth aspect, the present invention is directed to a method of using a fibrillated nanofiber as a filter media for particle removal, comprising: providing a plurality of fibrillated nanofibers; loading the fibrillated nanofibers with a subdivided media; forming the fibrillated nanofibers into a pleated sheet; and incorporating at least one of the pleated sheets into a filter cartridge.

In a fifth aspect the present invention is directed to a method of using a fibrillated nanofiber as a filter media for particle removal, comprising: providing a plurality of fibrillated nanofibers; loading the fibrillated nanofibers with a subdivided media; utilizing the loaded nanofibers as a precoat filter layer for the filter media.

In a sixth aspect, the present invention is directed to a method of using a fibrillated nanofiber as a filter media for particle removal of waste generated by a nuclear power plant process, comprising: providing a plurality of fibrillated nanofibers; loading the fibrillated nanofibers with a subdivided media; forming the fibrillated nanofibers into a pleated sheet; incorporating at least one of the pleated sheets into a filter cartridge for removing colloidal transition metal species from waste generated by a nuclear power plant; placing the filter cartridge inline with process waste from the nuclear power plant.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 depicts a table of the measured lead particulate values for ten filter systems and two control units after a two (2) liter flow.

FIG. 5 depicts a table of the measured lead particulate values for the ten filter systems and two control units after four (4) liters of flow.

DESCRIPTION OF THE PREFERRED EMBODIMENT(S)

Figure 1B:
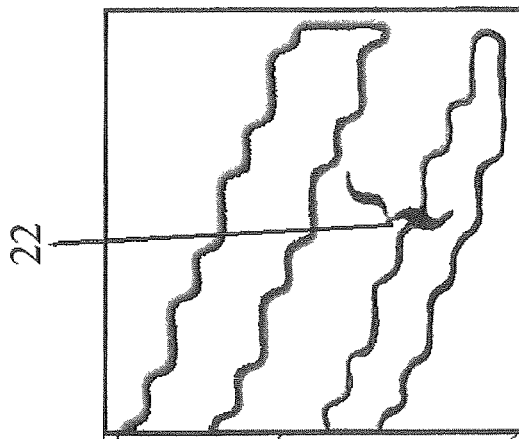
FIG. 1B is an expanded view of the filter media of FIG. 1 depicting at the interface medium a filter region where the colloidal lead particles are trapped from flowing directly through to filter media.

In describing the preferred embodiment of the present invention, reference will be made herein to FIGS. 1-7 of the drawings in which like numerals refer to like features of the invention.

As used in this application, "nanofibers" means core fibers having diameters of less than forty (40) microns, and preferably less than 10 microns. "Fibrillation" means a physical process designed to generate fine tendrils of nanofibers attached to a main or core fiber, having a diameter preferably less than one (1) micron.

Fibrillated nanofibers offer previously unanticipated benefits in certain water treatment applications. Standard fiber types such as cellulose and acrylic may be used as starting materials for the nanofiber fibrillation process. In the nanofiber fibrillation process, the core fibers used are preferably on the order of 3.5 mm in length, although for some applications smaller lengths would be preferred, and then fibrillated to provide for many fine tendrils extending from the core.

The fibrillated nanofibers may be used as made or further processed into other useful forms such as sheets or pleated membranes. The sheets, in turn, may be layered, wrapped, or fabricated into flow-through forms. The pleated membranes may be utilized as made or further fabricated into cartridge filters alone or in combination with other materials.

The fibrillated nanofibers provide significant performance advantages when used in combination with other materials used currently for water treatment applications. The unique structure of the fibrillated fibers allow much higher loading of these water treatment materials than can be achieved with current technology. The loading materials may be charged or neutral species. Examples of these materials include, but are not limited to, synthetic organic and inorganic ion exchangers, zeolites, carbon, adsorbents, and metal oxides, such as titanium oxide, metal hydroxides, and other filter aids.

Pleated sheets of the fibrillated nanofibers can be incorporated into small cartridges such as those used in carafes, point-of-use (POU) vessels, or point-of-entry (POE) vessels. These embodiments are applicable to drinking water and process water applications. The fibrillated nanofiber configuration allows for better filtration, especially for colloidal particles, without sacrificing hydraulic properties or service life. A prime example of this type of use is treating potable waters for removal of colloidal lead, a procedure that is difficult or even unattainable with prior art commercial technologies. It should be noted that although the removal of lead contaminants is described herein, the present invention is not limited to any particular contaminant, and may be employed for other contaminants that exist in soluble and colloidal states, and as well as for noncolloidal particles. Lead contaminant removal is discussed as an illustrative example.

The requirements for the removal of colloidal lead are dictated in part by a recent aggressive NSF lead protocol, which requires the removal of lead in low pH treated challenge water, as well as high pH treated challenge water. Although the NSF/ANSI protocol is a governing procedure in the industry for contaminant removal in drinking water, it is not the only procedure, and the present invention can be adjusted to accommodate other contaminant removal protocols that may be different or more or less stringent than the NSF/ANSI standard.

In the governing NSF test, about 100 parts-per-billion (ppb) of soluble lead is introduced in treated challenge water. The lead particle sizes are on the order of 0.1 to 1.2 microns. Generally, particles on the order of 1 micron or less will remain in suspension.

In a preferred embodiment, as shown in FIG. 1, a filter 10 comprising two filter media 12, 14 is introduced. A pleated filter is shown for illustrative purposes; however, the present invention is not limited to other filter media shapes or formations. Using a gravity flow model as an illustrative example, although the present invention is not to be so limited, treated challenge water meeting the NSF requirements flows into first filter media 14 which is predominantly of suitable material capable of removing soluble lead from treated challenge water. When NSF treated challenge water passes through the interface medium 18 between first media 14 and second media 12, the demarcation between the two filter media stops the travel of particulate lead 20, and prohibits particulate lead 20 from passing through to second media 12. The particulate or colloidal lead 20 is trapped at interface 18. The predisposition of particulate or colloidal lead 20 is ultimately to transform into soluble solution through absorption. Consequently, the treated challenge water become soluble with lead by solubilizing the colloidal lead until all of the particulate lead 20 trapped at interface medium 18 is absorbed into the treated challenge water. Preferably, filter media 14 is a non-physical filter media, insomuch as it is not chiefly designed to stop physical (colloidal) lead particles. Such filter media may be formed from impregnated paper, although other forms of filter media may be used provided the filter media is predominantly a soluble filter media.

Figure 1A:
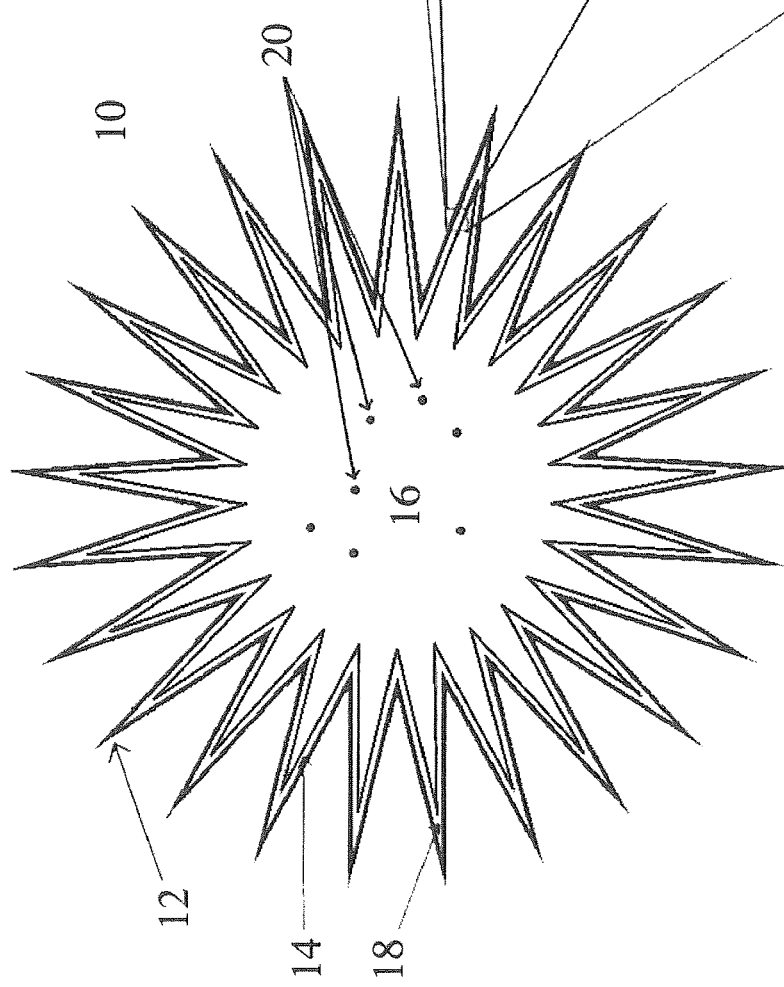
FIG. 1A is a cross-sectional view of a double pleated media filter for removing soluble and insoluble colloidal material from a fluid.

As depicted by the expanded view of FIG. 1A, at interface medium 18, a filter region 22 is formed where the insoluble and colloidal lead particles are trapped from flowing directly through to filter media 12. In this filter region 22, a combination of soluble and colloidal lead exists. As the colloidal lead is absorbed into the flow-through challenge water, it passes through interface medium 18 where filter media 12 removes the soluble lead.

Figure 2:
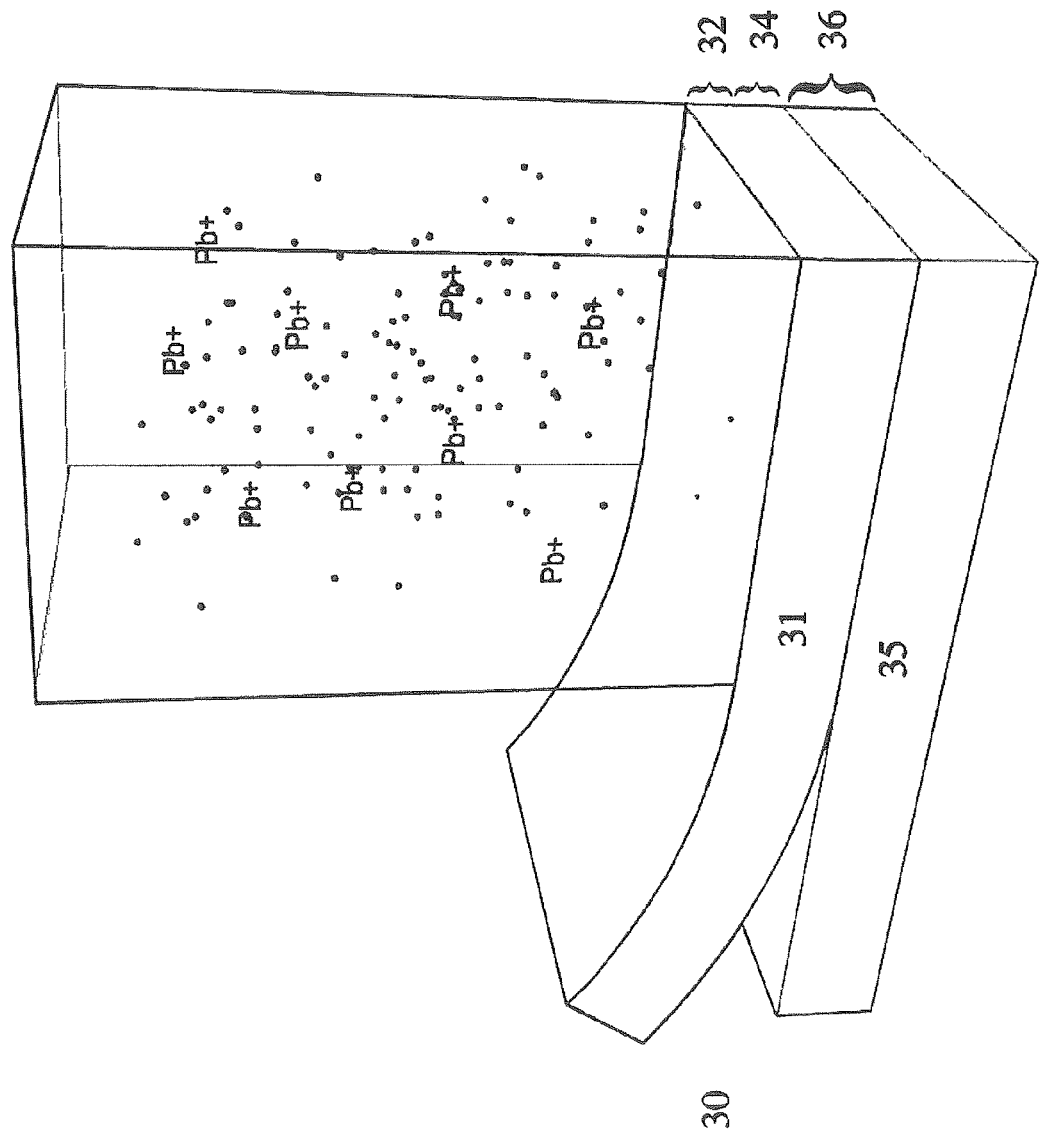
FIG. 2 is a cross-sectional view of the filter media of FIG. 1 depicting three filter regions for removing soluble and colloidal material from a fluid.

In this manner, as depicted in FIG. 2, a three-dimensional cross-sectional view of a two-filter media filter 30 forms a three region filter. In the first filter region 32, where the treated challenge water is introduced, a soluble lead filter media of impregnated paper that contains immobilized filter aids, such as carbon, ion exchange beads, fibrillated nanofibers, and other suitably performing filter media, is presented to the treated challenge water to remove as much soluble lead as possible. In filter region 34, lead particles are trapped at the interface between the first filter media 31 and second filter media 36. The interface between the two filter media is necessary to stop physical components of lead. Once trapped, the physical lead particles will remain at the interface, within filter region 34, until they become soluble and dissolve into the flowing treated challenge water. When the previously captured physical lead particles are completely absorbed into the flowing treated challenge water, second filter media 36, forming effectively a third filter region, acts to remove the remaining soluble lead.

Figure 3:
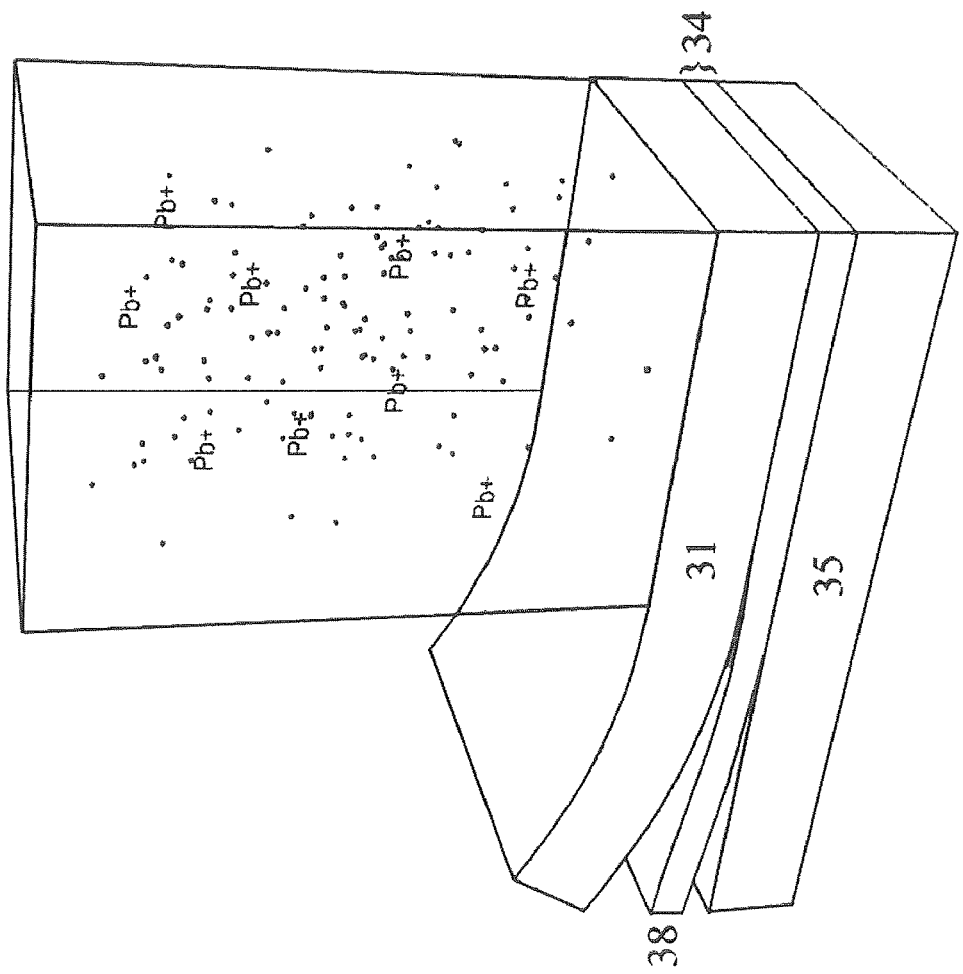
FIG. 3 is a cross-sectional view of a triple filter media for removing soluble and colloidal material from a fluid.

In another embodiment, as depicted in FIG. 3, a three-dimensional cross-sectional view shows a filter media 38 inserted where filter region 34 currently exists. The surface of filter 38 replaces the surface of the second filter media 36. Filter 38 will then act as a new interface and there will be a filter region that then extends above filter 38. Filter 38 may be formed of a polymer treated filter media, or the like, to facilitate more effectively the trapping of physical lead particles and enhancing the absorption of the lead particles into the flowing, treated challenge water.

Generally, low pH treated challenge water, which includes soluble lead, may have its soluble lead successfully removed by certain filter media, such as ion exchange beads. In contrast, ion exchange beads, resin or powder is not as efficient at removing soluble lead from high pH treated challenge water. However, the new NSF testing protocol defines an allowable lead particulate level in a high pH (6.5 pH and 8.5 pH) treated challenge water. A high pH lead filter of the present invention will successfully remove soluble lead from high pH treated challenge water, where other filter media of the prior art cannot perform to the stringent NSF standards. A first filter media of ion exchange beads, resin, or powder, in combination with a second filter media of impregnated paper, fibrillated nanofibers, or the like, which form to create an intermediate filter region for stopping physical components of lead at the filter media interface, for eventual absorption into the fluid and subsequent removal by the second filter media, will successfully remove soluble and insoluble lead from a high pH solution pursuant to the NSF protocol.

Pleated sheets of fibrillated nanofibers offer benefits for fluid and gas filtration applications, including the formation of at least one media of the three region filter as discussed above.

Particulate Lead Reduction Tests

Ten (10) systems were tested for lead reduction. The filters had filter paper made of nanofibers with varying mean flow pore diameters from 0.26 microns to 2.6 microns. A lead solution in accordance with the NSF pH 8.5 lead standard. Four (4) liters of solution was introduced through gravity flow, the effluents collected, and the lead concentration measured according to the NSF protocol.

In all ten systems, the total soluble lead portion of the solution was not affected. The particulate portion was affected, and the particle reduction efficiency increased as the mean flow pore diameter decreased. The mean flow pore diameter for a filter of the present invention would be preferably approximately 1.2 microns or less. The NSF protocol allows for a maximum effluent concentration of lead of ten (10) parts per billion (ppb). Filter having a 1.2 micron mean flow pore size exhibited a total effluent for particulate lead of between 6 ppb and 10 ppb.

The results show that the total lead particulate was reduced below 10 ppb using a filter design of the present invention when using a filter having a mean flow pore diameter below 1.2 microns. The reduction was increased as the pore size decreased.

FIG. 4 depicts a table of the measured lead particulate values for the ten filter systems and two control units after a two (2) liter flow. FIG. 5 depicts a table with the same values after four (4) liters of flow. As shown, the lead particulate reduction increased as the mean flow pore diameter decreased. Furthermore, the reduction efficiency increases as more water is passed through the filters, which is also a result of the decrease in the effective overall pore size, as the lead particulates are stopped on the surface of the filter media.

Figure 6:
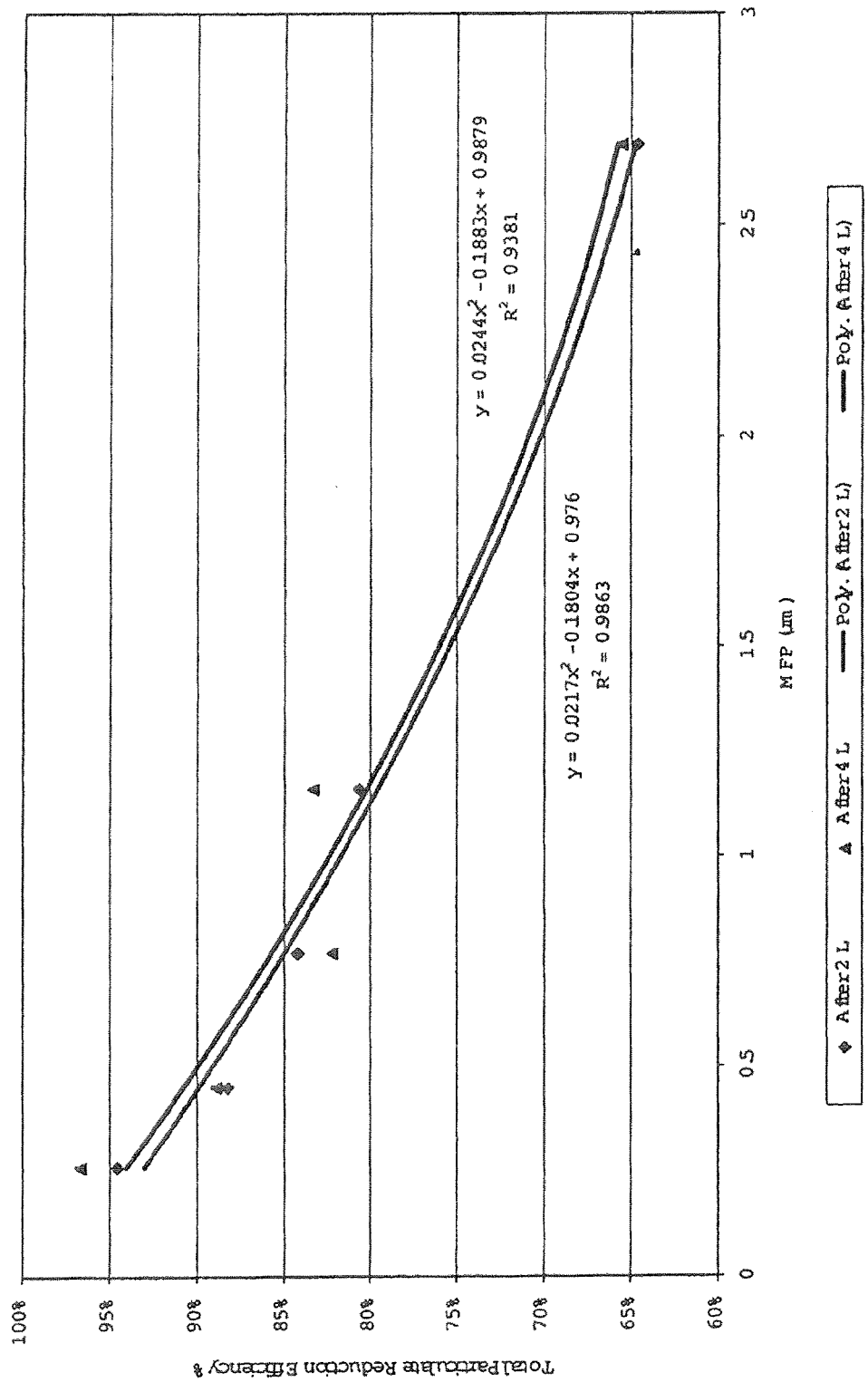
FIG. 6 depicts a graph of the average total particulate lead reduction efficiency versus the mean flow pore diameter.
Figure 7:
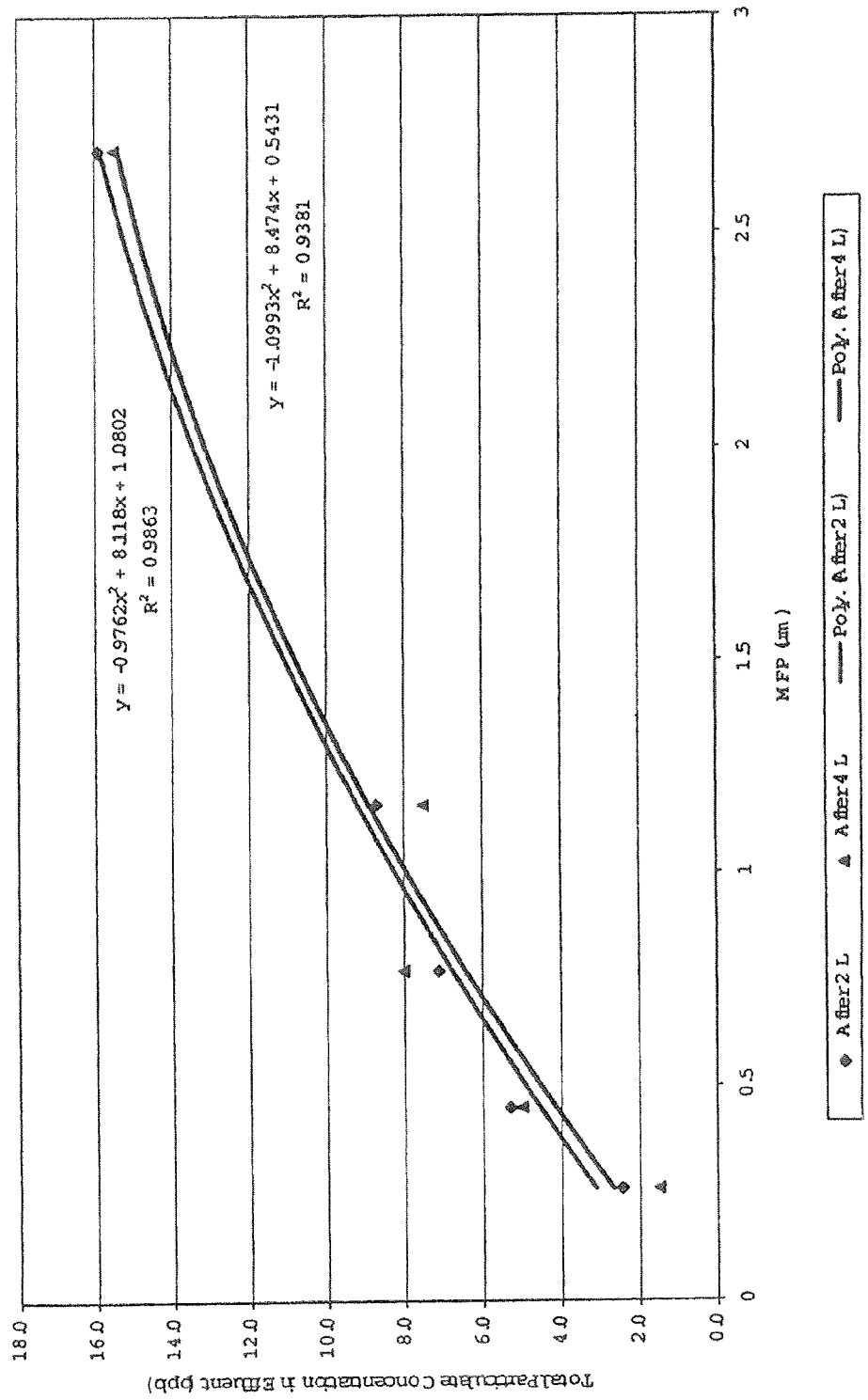
FIG. 7 depicts a graph of the effluent total particulate concentration versus the mean flow pore diameter.

FIG. 6 depicts a graph of the average total particulate lead reduction efficiency versus the mean flow pore diameter. As expected, the reduction efficiency decreases with increasing pore size. FIG. 7 depicts a graph of the effluent total particulate concentration versus the mean flow pore diameter. The total particulate concentration in the effluent increases as the pore diameter increases. As supported by the test data, the total effluent lead concentration drops below 10 ppb when the mean flow pore diameter is approximately 1.2 microns or less. A pore size of approximately 0.5 to 0.7 microns has been shown to be effective, and would sufficiently meet and exceed NSF standards. This ensures that nearly 100% of the soluble portion of the influent can be removed with a lead adsorbing media, ion exchange media, or the like. Additionally, the lead adsorbents or ion exchange media may be introduced directly to the paper itself, which would increase the total particulate lead reduction further by converting some of the particulate portion in the influent to soluble lead for subsequent removal by the filter media.

The filter media, including the fibrillated nanofiber media, may be further "loaded" with finely subdivided media of powdered ion exchange resins, adsorbents, carbon, or the like. In this context, "loading" can mean either flocculation including electrical interactions, physical adsorptions, or the like on the nanofiber surface. In either case, the fibrillated nanofibers offer significantly greater surface area and tighter pore size. The latter combination provides better filtration, especially for small particles, such as colloids, without the typical detrimental effect on differential pressure.

Performance of conventional flocculated products containing fiber, cation exchange resin, anion exchange resin, and/or other adsorbents, such as carbon, zeolites, and the like, can be limited by both hydraulic characteristics and operational capabilities. Substitution of fibrillated nanofibers for standard chopped fibers offers enhances utility due to lower differential pressure and higher operational capacity for better loading of the ion exchange resins on the fiber.

In the case of absorptive loading onto the fibrillated nanofiber, the quantity of ion exchange resin, anion exchange resin, adsorbent, or added filter aid increases over that allowed with standard flocculation or absorption. Greater loading, in turn, offers higher capacity and better removal of contaminants. Moreover, the increased loading capacity facilitates production of flocculated type products in one or two steps rather than the customary three step process of the prior art.

The superior filtration characteristics of the fibrillated nanofibers offers much improved removal of colloidal particles from aqueous solutions. Using fibrillated nanofibers as one of the filter media in the filter of the present invention, assists in trapping the colloidal lead particles at the interface, and removing the soluble lead as it flows through the filter media. In another embodiment of this filter media, fibrillated nanofibers may be incorporated into a sheet or pleated membrane.

In another embodiment, fibrillated nanofibers may be employed to remove colloidal transition metal species from waste or other streams in nuclear power plants. Colloidal versions of cobalt, iron, cesium, antimony, nickel, copper, and the like, that may be radioactive, and normally prove extremely troublesome in the treatment of so-called "radwaste," may be remove prior to discharge with the incorporation of fibrillated nanofibers in the operative filter media. The fibrillated fibers used in this filtration process may also be provided with added ion exchange properties, or loaded with other adsorbents previously described.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention,

What is claimed is:

1. A filter for removing soluble, colloidal, and insoluble material from a fluid comprising:
    a container for receiving ingress fluid, and for securing and introducing filter media to said fluid;
    a first filter media for filtering soluble material from said fluid;
    a second filter media, adjacent and in fluid communication with, said first filter media, for filtering said soluble material from said fluid;
    wherein said first and second filter media create a physical barrier for said colloidal material at their interface for capturing said colloidal particles;
    said colloidal particles retained at said interface until becoming soluble in said fluid, passing through said interface, and being removed by said second filter media.

2. The filter of claim 1 wherein said soluble and colloidal material includes lead, organic contaminants, or inorganic contaminants.

3. The filter of claim 1 including having fibrillated nanofibers as one of said filter media.

4. The filter of claim 3 wherein said fibrillated nanofibers includes cellulose or acrylic compositions.

5. The filter of claim 3 wherein said fibrillated nanofibers comprise at least one pleated sheet of filter material.

6. The filter of claim 1 including having ion exchange beads, powder, resins, an adsorbent, zeolites, or carbon as one of said filter media.

7. A filter for removing soluble, colloidal, and insoluble material from a fluid comprising:
    a container for receiving ingress fluid, and for securing and introducing filter media to said fluid;
    a first filter media for filtering soluble material from said fluid;
    a second filter media in fluid communication with said first filter media, for filtering said soluble material from said fluid; and
    between said first and second media, for capturing said colloidal material;
    wherein said third filter media creates a physical barrier for said colloidal material;
    said colloidal particles are retained at said third filter media until becoming soluble in said fluid. and being removed by said second filter media.

8. The filter of claim 7 wherein said third filter media includes a polymer treated based filter material.

9. The filter of claim 7 wherein said third filter media includes fibrillated nanofibers.

10. The filter of claim 9 wherein said fibrillated nanofibers are loaded with finely subdivided media of powdered ion exchange resins, metal oxides, or metal hydroxides.

11. The filter of claim 10 wherein loaded fibrillated nanofibers includes flocculation.

12. The filter of claim 11 wherein said flocculation includes electrical interactions or physical adsorptions.

13. A filter for removing soluble, insoluble, and colloidal lead particles from a high pH fluid comprising:

a container for receiving ingress fluid, and for securing and introducing filter media to said fluid;
a first filter media including ion exchange beads, resin, or powder, for filtering soluble lead from said fluid;
a second filter media, adjacent and in fluid communication with, said first filter media including fibrillated nanofibers, for filtering soluble lead from said fluid;
wherein said first and second filter media create a physical colloidal lead barrier at their interface for capturing said colloidal lead particles;
said colloidal lead particles retained at said interface until becoming soluble and absorbed by said fluid, thus passing through said interface, and removed from said fluid by said second filter media.

14. A filter for removing soluble, insoluble, and colloidal lead particles from a high pH fluid comprising:
a container for receiving ingress fluid, and for securing and introducing filter media to said fluid;
a first filter media including ion exchange beads, resin, or powder, for filtering soluble lead from said fluid;
a second filter media in fluid communication with said first filter media, including fibrillated nanofibers for filtering soluble lead from said fluid; and
a third filter media, located between said first and second filter media;
wherein said third filter media creates a physical colloidal lead barrier for capturing said colloidal lead particles;
said colloidal lead particles retained at said physical colloidal lead barrier until becoming soluble and absorbed by said fluid, thus passing through said barrier, and removed from said fluid by said second filter media.

15. The filter of claim 14 wherein said third filter media includes a polymer treated based filter material.

16. The filter of claim 14 wherein said third filter media includes fibrillated nanofibers.

17. A process for removing soluble and particulate lead from a high pH fluid comprising:
introducing a first filter media in the path of fluid flow wherein said fluid contains soluble and particulate lead;
removing soluble lead from said fluid by said first filter media;
capturing particulate lead particles at an interface region where a second filter media is introduced in said path of fluid flow, and keeping said particulate lead particles captured until soluble in said fluid; and
removing soluble lead from said fluid by second filter media.

18. A process for removing soluble and particulate lead from a high pH fluid comprising:
introducing a first filter media in the path of fluid flow wherein said fluid contains soluble and particulate lead;
removing soluble lead from said fluid by said first filter media;
capturing particulate lead particles at an interface region where a third filter media is introduced in said path of fluid flow, located between and adjacent to said first filter media and a second filter media, and keeping said particulate lead particles captured until soluble in said fluid; and
removing soluble lead from said fluid by a second filter media.

19. A method of using a fibrillated nanofiber as a filter media for particle removal, comprising:
providing a plurality of fibrillated nanofibers;
loading said fibrillated nanofibers with a subdivided media;
forming said fibrillated nanofibers into a pleated sheet; and
incorporating at least one of said pleated sheets into a filter cartridge.

20. The method of claim 19 including providing ion exchange resins to said fibrillated nanofibers.

21. The method of claim 19 wherein said fibrillated fibers include cellulose or acrylic nanofibers.

22. The method of claim 19 wherein said loading step comprises flocculation of said fibrillated nanofibers.

23. A method of using a fibrillated nanofiber as a filter media for particle removal, comprising:
providing a plurality of fibrillated nanofibers;
loading said fibrillated nanofibers with a subdivided media;
utilizing said loaded nanofibers as a precoat filter layer for said filter media.

24. A method of using a fibrillated nanofiber as a filter media for particle removal of waste generated by a nuclear power plant process, comprising:
providing a plurality of fibrillated nanofibers;
loading said fibrillated nanofibers with a subdivided media;
forming said fibrillated nanofibers into a pleated sheet;
incorporating at least one of said pleated sheets into a filter cartridge for removing colloidal transition metal species from said waste;
placing said filter cartridge inline with said waste from said nuclear power plant.

25. The method of claim 24 wherein said filter media includes carbon.

26. The method of claim 24 wherein said filter media includes ion exchange resins.

27. The method of claim 26 including providing ion exchange resins directly to said fibrillated nanofibers.

* * * * *

UNITED STATES PATENT AND TRADEMARK OFFICE
CERTIFICATE OF CORRECTION

| | | |
|---|---|---|
| PATENT NO. | : 8,002,990 B2 | Page 1 of 1 |
| APPLICATION NO. | : 12/177610 | |
| DATED | : August 23, 2011 | |
| INVENTOR(S) | : John H. Schroeder et al. | |

It is certified that error appears in the above-identified patent and that said Letters Patent is hereby corrected as shown below:

In the Claims:

Column 8, Claim 7, lines 48-49, delete "between said first and second media, for capturing said colloidal material;" and substitute therefor:

-- a third filter media, located between said first and second media, for capturing said colloidal material; --

Signed and Sealed this
Sixth Day of December, 2011

David J. Kappos
*Director of the United States Patent and Trademark Office*